US012323059B2

(12) United States Patent
Zhao

(10) Patent No.: US 12,323,059 B2
(45) Date of Patent: Jun. 3, 2025

(54) SUPERCAPACITOR-BASED AUTOMATIC ENERGY-SAVING SYSTEM OF DIRECT-CURRENT HIGH-VOLTAGE BEAM PUMPING UNIT

(71) Applicant: KYOCERA AVX Components (Chengdu) Co., Ltd., Sichuan (CN)

(72) Inventor: Bo Zhao, Sichuan (CN)

(73) Assignee: KYOCERA AVX Components (Chengdu) Co., Ltd., Sichuan (CN)

( * ) Notice: Subject to any disclaimer, the term of this patent is extended or adjusted under 35 U.S.C. 154(b) by 18 days.

(21) Appl. No.: 17/439,209

(22) PCT Filed: Mar. 16, 2020

(86) PCT No.: PCT/CN2020/079543
§ 371 (c)(1),
(2) Date: Jun. 13, 2022

(87) PCT Pub. No.: WO2020/182220
PCT Pub. Date: Sep. 17, 2020

(65) Prior Publication Data
US 2024/0405679 A1 Dec. 5, 2024

(30) Foreign Application Priority Data
Mar. 14, 2019 (CN) .......................... 201910194430.4

(51) Int. Cl.
*G06F 1/32* (2019.01)
*G06F 1/3234* (2019.01)
(Continued)

(52) U.S. Cl.
CPC ........ *H02M 3/1582* (2013.01); *G06F 1/3234* (2013.01); *G06F 3/147* (2013.01)

(58) Field of Classification Search
CPC ....... G06F 1/3234; G06F 3/14; H02M 3/1582
See application file for complete search history.

(56) References Cited

U.S. PATENT DOCUMENTS

2011/0084648 A1 4/2011 Cao et al.
2016/0082844 A1 3/2016 King et al.

FOREIGN PATENT DOCUMENTS

CN 102427262 4/2012
CN 103647500 3/2014
(Continued)

OTHER PUBLICATIONS

English translation—CN107453449A May 20, 2015.*
International Search Report and Written Opinion for PCT/CN2020/079543, dated Jun. 4, 2020, 16 pages.

*Primary Examiner* — Nitin C Patel
(74) *Attorney, Agent, or Firm* — Dority & Manning, P.A.

(57) ABSTRACT

Disclosed is a supercapacitor based automatic energy-saving system of a direct-current high-voltage beam pumping unit. The system comprises a frequency converter, wherein a direct-current bus of the frequency converter is combined with a direct-current contactor, a BUCK/BOOST power conversion circuit and an energy storage unit to form a series loop. The system further comprises a single-chip microcomputer system mainboard, which is in communication connection with the energy storage unit. A BUCK/BOOST pre-stage PWM processing circuit is connected to the single-chip microcomputer system mainboard and the BUCK/BOOST pre-stage PWM processing circuit includes a dead zone logic processing circuit, an optical coupling isolator, an IGBT power drive and protection circuit. After a supercapacitor module is used as an energy storage unit to recycle power generated by an electric motor, the system first uses the recycled power in the beam pumping unit when the electric motor is in a power consumption state once again, such that more energy is saved, and an external power grid is not affected.

9 Claims, 3 Drawing Sheets

(51) Int. Cl.
*H02M 3/158* (2006.01)
*G06F 3/147* (2006.01)

(56) References Cited

FOREIGN PATENT DOCUMENTS

| | | |
|---|---|---|
| CN | 204349549 | 5/2015 |
| CN | 105119311 | 12/2015 |
| CN | 107453449 | 12/2017 |
| CN | 107591864 | 1/2018 |
| CN | 108110781 | 6/2018 |
| CN | 109950963 | 6/2019 |
| CN | 209675992 | 11/2019 |
| JP | 2001086661 | 3/2001 |

\* cited by examiner

SUPERCAPACITOR-BASED AUTOMATIC ENERGY-SAVING SYSTEM OF DIRECT-CURRENT HIGH-VOLTAGE BEAM PUMPING UNIT

TECHNICAL FIELD

The present invention relates to the technical field of oil mining equipment, to be specific, an energy recycling device of a pumping unit in an oil field, in particular to a supercapacitor based automatic energy-saving system of a direct-current high-voltage beam pumping unit.

BACKGROUND ART

Pumping units are necessary equipment for oil mining, and pumping units are predominantly beam pumping units in the current oil mining industry. Only the number of beam pumping units is up to 100,000. The total capacity of electric motors thereof is above 35 million kilowatts and the annual power consumption of electric motors is above 10 billion kilowatt-hours, and the power consumption of beam pumping units accounts for about 40% of the total power consumption in oil fields. To improve the efficiency, frequency converters are gradually adopted to control electric motors. Because of beam pumping units' own characteristics, electric motors have two power generation states in a working period. The power generated by electric motors will increase the voltage on direct-current buses of frequency converters, thus bringing a risk to frequency conversion circuits. The current handling solution is that a brake resistor is used to turn the power generated by an electric motor into heat energy for release while a frequency converter is adopted. This is a waste from the angle of energy sources. How to efficiently utilize the power generated by electric motors is a new topic in the application of beam pumping units. Related technical experts in current experimental research and development propose that power generated by electric motors is inversely converted by a special grid-tie inverter into a co-frequency and co-phase three-phase alternating-current with a power grid and is fed back to the power grid. However, from an analysis of the working condition of beam pumping units, it can be learned that the period of power generation of an electric motor is short, the generated power is an intermittent energy and the power generated each time is small. The technical difficulty of the grid-tie inverter is high, the self-consumption is large, and the efficiency is low. In addition, the grid-tie inverter needs to be started repeatedly and frequently. On the one hand, the reliability of the grid-tie inverter is affected. On the other hand, the intermittent energy also causes secondary pollution to the power grid when fed back to the power grid. Furthermore, the feedback power cannot offset the power consumption or bring about any actual economic benefits to a user but increases the cost of the user. Thus, this mode can be used only as a laboratory research and is not accepted by the user. The problem that currently needs to be solved is how to realize high-efficiency secondary utilization of the power generated by electric motors in actual projects, achieve energy saving without any influence on an external power grid, and let the user directly experience the economic benefits brought about by the energy-saving system.

SUMMARY OF THE INVENTION

The object of the present invention is to provide a supercapacitor based automatic energy-saving system of a direct-current high-voltage beam pumping unit to solve the problem that the power generated by electric motors cannot be recycled and the power consumption cost of the user cannot be reduced in the prior art.

The present invention solves the above-mentioned problem through the following technical solution:

A supercapacitor based automatic energy-saving system of a direct-current high-voltage beam pumping unit comprises a frequency converter connected to a three-phase power grid and a three-phase alternating-current contactor; a direct-current bus of the frequency converter is combined with a direct-current contactor, a BUCK/BOOST power conversion circuit and an energy storage unit to form a series loop; the system further comprises a single-chip microcomputer system mainboard connected to the direct-current contactor and the BUCK/BOOST power conversion circuit; the single-chip microcomputer system mainboard is in communication connection with the energy storage unit; a BUCK/BOOST pre-stage PWM processing circuit is connected between the single-chip microcomputer system mainboard and the BUCK/BOOST power conversion circuit; the BUCK/BOOST pre-stage PWM processing circuit comprises a BUCK module PWM processing circuit and a BOOST module PWM processing circuit which are connected to the single-chip microcomputer system mainboard; a dead zone logic processing circuit is connected between the BUCK module PWM processing circuit and the BOOST module PWM processing circuit; and the BUCK module PWM processing circuit and the BOOST module PWM processing circuit are connected to the BUCK/BOOST control ends of the BUCK/BOOST power conversion circuit, respectively, after being connected to an optical coupling isolator and an IGBT power drive and protection circuit, respectively.

Principle of Operation

The three-phase alternating-current contactor is the power supply input end and connects a 380V alternating-current voltage to the control coil of the three-phase alternating-current contactor. When the power grid supplies power normally, the three-phase alternating-current contactor pulls in and the normal open contact is closed to supply power to the system normally. When the electric motor is in a power generation state, the BUCK/BOOST power conversion circuit works in BUCK mode. The output of the BUCK circuit is connected to the positive electrode of the energy storage unit and the potential energy of the beam pumping unit is converted by the electric motor into alternating-current electric energy. The alternating-current voltage is exerted on the direct-current bus. In this case, the voltage on the direct-current bus will increase (a resistor is used to consume the increased voltage and turn it into heat energy for release in the conventional frequency converter applications; this not only wastes electric energy, but also brings about thermal pollution to the natural space), and the BUCK conversion circuit adopts the electric-magnetic-electric conversion mode to store the increased voltage in the energy storage unit. The energy storage unit realizes the function of storing recycled energy. When the electric motor is in the power consumption state again, the system first boosts the voltage in the energy storage unit though the BOOST circuit and supplies the voltage to the direct-current bus so that the frequency converter uses it to drive the electric motor of the beam pumping unit. When the total voltage in the energy storage unit is lower than a benchmark voltage, the BOOST circuit is closed and the system recovers the power supply of the external power grid, thus achieving the purpose of energy saving of the beam pumping unit and secondary utilization of the energy source. The function of the direct-current contactor is to connect the system with the direct-current bus of the frequency converter when the initialization of the system is completed, thus realizing the transmission of electric energy on the direct-current bus. The direct-current contactor is disconnected to ensure the safety of the frequency converter and the energy-saving system when the system is initialized or when the system does not work.

The BUCK/BOOST pre-stage PWM signal processing circuit sends PWM signals output by the single-chip microcomputer to the IGBT power drive and protection circuit through a plug-in after hardware logic processing, dead zone logic processing, level conversion and power amplification. The function of the IGBT power drive and protection circuit is to improve the drive capability of PWM to ensure that the IGBT module of the BUCK/BOOST power conversion circuit can be effectively driven, and to restrict the instantaneous voltage/current of the drive gate to ensure the working safety of the IGBT module. A dead zone logic processing circuit is added so that the safety of the circuit is increased.

Further, the BUCK/BOOST power conversion circuit comprises two IGBT modules connected in series and a BUCK/BOOST conversion inductor, the BUCK/BOOST conversion inductor is formed by winding a plurality of strands of cotton insulated wires around a high-power magnetic ring to realize a BUCK/BOOST energy conversion, the series connection node of the two IGBT modules is connected to the BUCK/BOOST conversion inductor, and the other ends of the two IGBT modules are connected to the direct-current bus and grounded, respectively, wherein the IGBT module connected to the direct-current bus and the BUCK/BOOST conversion inductor form a BUCK circuit, the other IGBT module forms a BOOST circuit together with the BUCK/BOOST conversion inductor, the BUCK/BOOST conversion inductor is connected to the energy storage unit, a node between the BUCK/BOOST conversion inductor is connected to the positive electrode of a diode D1, and the negative electrode of the diode D1 is connected to the direct-current bus.

Principle of Operation

The IGBT modules and power type IGBT modules realize switch control in the BUCK circuit and the BOOST circuit. The IGBT modules are major power devices of the system and the size of the converted current directly decides the heat loss of the IGBT modules. Therefore, the energy storage unit of the present invention also reduces the requirements of the system for the IGBT modules. The IGBT power drive circuit consists of an isolated drive power supply, isolated optical coupler and a drive transistor. The function of the IGBT power drive circuit is to receive PWM signal control sent from the single-chip microcomputer system mainboard to realize effective driving of the IGBT modules in the BUCK circuit and the BOOST circuit, and ensure the level isolation between the high- and low-voltage circuits. The power conversion inductor mainly realizes an electromagnetic conversion of the BUCK circuit and the BOOST circuit. The inductor is formed by winding a plurality of strands of cotton insulated wires around a high-power magnetic ring and has a high high-frequency performance and a high conversion efficiency. The diode D1 allows the potential energy of the beam pumping unit to be converted by the electric motor into an alternating-current voltage when the electric motor is in the power generation state. The alternating-current voltage is converted by a backward diode D1 connected with the IGBT module in parallel and is then superimposed on the direct-current bus. In this case, the voltage on the direct-current will increase, and the BUCK conversion circuit adopts the electric-magnetic-electric conversion mode to store the increased voltage in the energy storage unit.

Further, an energy storage unit zero-volt charging and benchmark processing circuit is connected to the three-phase alternating-current contactor, the other end of the energy storage unit zero-volt charging and benchmark processing circuit is connected to a charging/discharging end of the energy storage unit, and the energy storage zero-volt charging and benchmark processing circuit is an isolated constant-current charging circuit.

The function of the energy storage unit zero-volt charging and benchmark processing circuit is to realize zero-volt charge for the initial power-on of supercapacitor modules on the one hand, and realize low-current charging for the 300V benchmark voltage of the supercapacitor modules on the other hand, thus improving the charging safety of the energy storage unit.

Further, an isolated voltage detection unit for a voltage detection of the direct-current bus, the energy storage unit and the three-phase alternating-current contactor are connected to the single-chip microcomputer system mainboard, a linear optical coupling mode is adopted for the isolated voltage detection unit for an electric motor detection and an electric isolation, an isolated current detection unit is further connected to the single-chip microcomputer system mainboard, and a Hall current sensor and a mutual inductance current sensor are adopted for the isolated current detection unit to detect the current of the electric motor and the current at a BUCK/BOOST voltage conversion and send the current to the single-chip microcomputer for signal processing.

Further, the isolated voltage detection unit comprises a power grid voltage detection subunit connected to the three-phase alternating-current contactor, a direct-current bus voltage detection subunit connected to the direct-current bus positive electrode and an energy storage voltage detection subunit connected to the energy storage unit, and the power grid voltage detection subunit, the direct-current bus voltage detection subunit and the energy storage voltage detection subunit are respectively connected to the single-chip microcomputer system mainboard after electrical/photoelectric isolation processing.

The isolated voltage detection unit adopts the optical coupling isolation technology to detect the voltage of the system bus, the voltage of the energy storage unit and the three-phase alternating-current voltage, respectively. The detection data are used as judgment bases of BUCK/BOOST working logics. The isolated current detection system is used to realize a current detection at a BUCK/BOOST voltage conversion, determine the charging/discharging state and send the data to the single-chip microcomputer for signal processing.

Further, the three-phase alternating-current contactor is connected to a system power supply for supplying power to the single-chip microcomputer system mainboard through a system switch, two-stage voltages are adopted for the system power supply, the first-stage voltage is 380V to 220V for isolating the transformer to convert the three-phase voltage into a 220V low voltage, and the second-stage voltage is a high-frequency flyback switching power supply. The volume of the three-phase alternating-current contactor is small and the working efficiency is high.

Further, the energy storage unit is formed by connecting a plurality of groups of supercapacitor monomers with a low internal resistance in series.

The energy storage unit is formed by connecting four groups and 60 strings of supercapacitor modules in series, and the application scope of the energy storage voltage platform formed by the supercapacitor energy storage modules is 300V to 624V.

Further, a display circuit is connected to the single-chip microcomputer system mainboard, and the display circuit is an organic light-emitting diode ("OLED") display. The function of the OLED display is to realize human-machine interactions of the system and display major parameters of the system in the form of graphs and texts on the liquid crystal display screen to let the equipment user or operator learn the real-time working state of the system. The OLED display has a high low-temperature performance and can work reliably at a temperature below 40° C.

Further, the single-chip microcomputer system mainboard comprises a single-chip microcomputer digital processing minimum system, a logic signal input/output processing circuit connected to the single-chip microcomputer digital processing minimum system and a display drive circuit for driving the OLED display, and the single-chip microcomputer type of the single-chip microcomputer digital processing minimum system is a TMS320F28335 floating point DSP.

Further, a controller area network ("CAN") CAN communication module for external communication is connected to the single-chip microcomputer system mainboard, and the isolated CAN2.0 communication mode is adopted for the CAN communication module.

Compared with the prior art, the present invention has the following advantageous effects:

(1) A high-voltage, low internal resistance supercapacitor platform is used as the energy storage unit in the present invention, and compared with a battery, the energy storage unit has the advantages such as high high-frequency performance, a high current, a small amount of heat, a high low-temperature performance, a long service life, and a high efficiency of energy recycling and secondary utilization. After the power generated by the electric motor is recycled, the system first uses the recycled electric energy in the beam pumping unit when the electric motor is in the power consumption state again. Thus, the external power grid will not be influenced.

(2) The beam pumping efficiently utilizes the power generated by the electric motor and thus uses less power on the power grid, allowing the user to spend a smaller amount of electric fee on the same amount of power consumption and bringing about substantive economic benefits to the user.

DETAILED DESCRIPTION OF THE INVENTION

The present invention is further described in detail in combination with embodiments, but the present invention is not limited to these embodiments.

Embodiment 1

Figure 1:
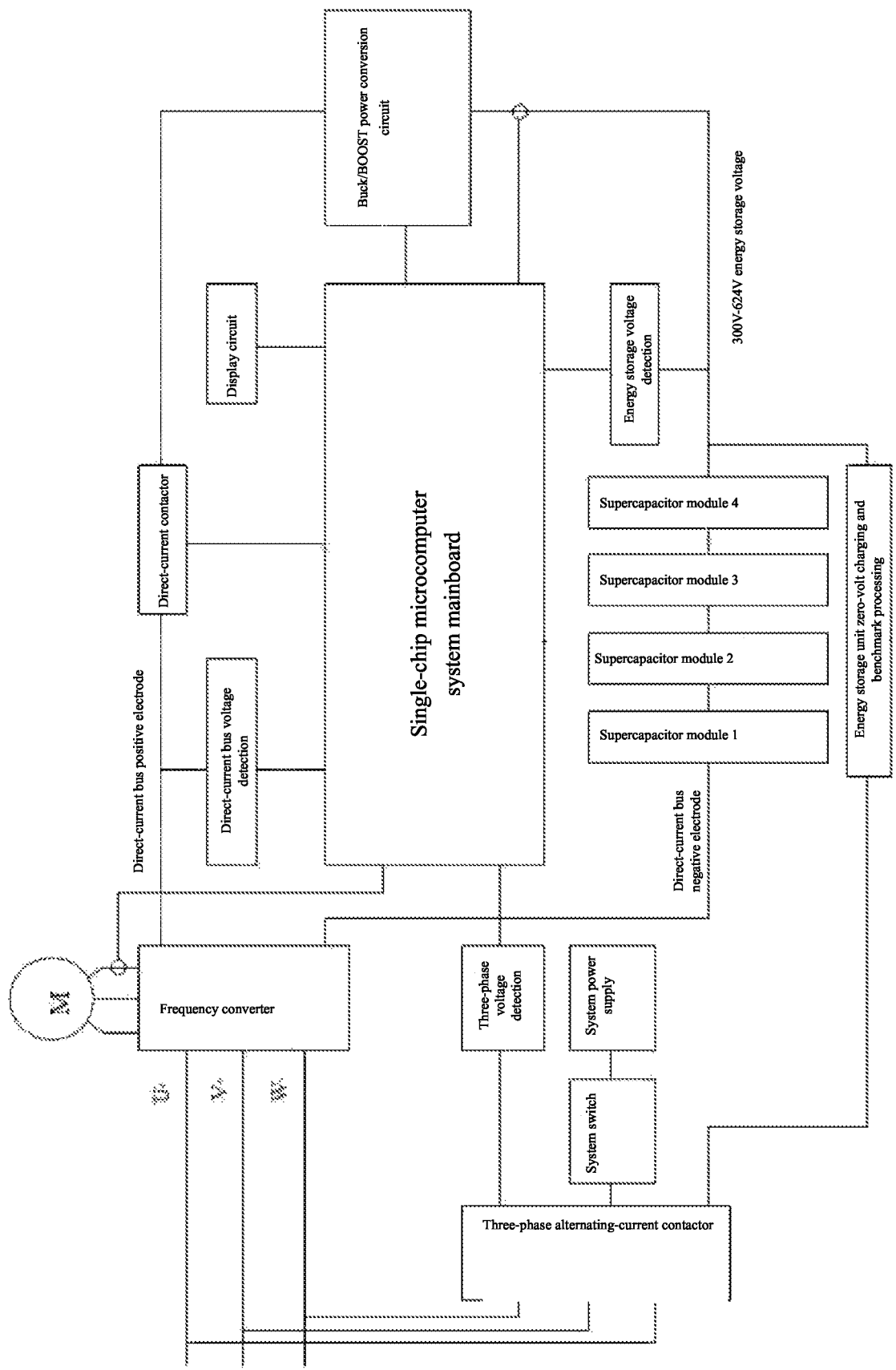
FIG. 1 is a block diagram of the system of the present invention.
Figure 2:
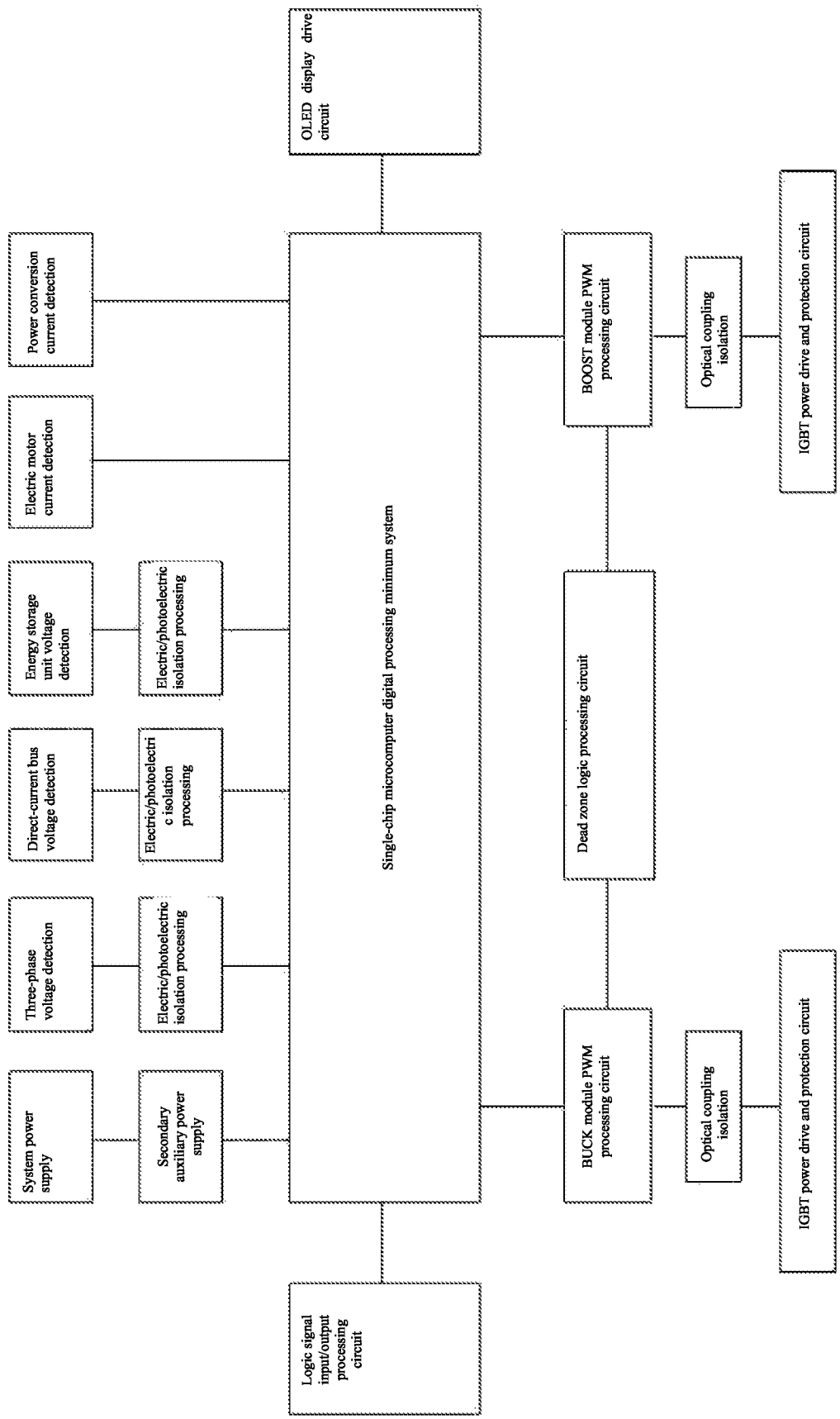
FIG. 2 is a schematic block diagram of the single-chip microcomputer system mainboard.

As shown in FIGS. 1 and 2, a supercapacitor based automatic energy-saving system of a direct-current high-voltage beam pumping unit comprises a frequency converter connected to a three-phase power grid and a three-phase alternating-current contactor; a direct-current bus of the frequency converter is combined with a direct-current contactor, a BUCK/BOOST power conversion circuit and an energy storage unit to form a series loop; the energy storage unit is formed by connecting four groups of supercapacitor modules in series; the system further comprises a single-chip microcomputer system mainboard connected to the direct-current contactor and the BUCK/BOOST power conversion circuit; the single-chip microcomputer system mainboard is in communication connection with the energy storage unit; a BUCK/BOOST pre-stage PWM processing circuit is connected between the single-chip microcomputer system mainboard and the BUCK/BOOST power conversion circuit; the BUCK/BOOST pre-stage PWM processing circuit comprises a BUCK module PWM processing circuit and a BOOST module PWM processing circuit which are connected to the single-chip microcomputer system mainboard; a dead zone logic processing circuit is connected between the BUCK module PWM processing circuit and the BOOST module PWM processing circuit; and the BUCK module PWM processing circuit and the BOOST module PWM processing circuit are connected to the BUCK/BOOST control ends of the BUCK/BOOST power conversion circuit, respectively, after being connected to an optical coupling isolator and an IGBT power drive and protection circuit, respectively.

Principle of Operation

The three-phase alternating-current contactor is the power supply input end and connects a 380V alternating-current voltage to the control coil of the three-phase alternating-current contactor. When the power grid supplies power normally, the three-phase alternating-current contactor pulls in and the normal open contact is closed to supply power to the system normally. When the electric motor is in a power generation state, the BUCK/BOOST power conversion circuit works in BUCK mode. The output of the BUCK circuit is connected to the positive electrode of the energy storage unit and the potential energy of the beam pumping unit is converted by the electric motor into alternating-current electric energy. The alternating-current voltage is exerted on the direct-current bus. In this case, the voltage on the direct-current bus will increase, and the BUCK conversion circuit adopts the electric-magnetic-electric conversion mode to store the increased voltage in the energy storage unit. The energy storage unit realizes the function of storing recycled energy. The total capacity of the energy storage unit is matched according to the power calculation of the beam pumping unit. In the present embodiment, the energy storage unit is formed by connecting four groups and 60 strings of supercapacitor modules in series, and the application scope of the energy storage voltage platform formed by the supercapacitor energy storage modules is 300V to 624V. When the electric motor is in the power consumption state again, the system first boosts the 300V to 624V voltage in the energy storage unit to a 600V to 624V voltage though the BOOST circuit and supplies the voltage to the direct-current bus so that the frequency converter uses it to drive the electric motor of the beam pumping unit. When the total series voltage of the supercapacitor modules is lower than a benchmark voltage 300V, the BOOST circuit is closed and the system recovers the power supply of the external power grid, thus achieving the purpose of energy saving of the beam pumping unit and secondary utilization of the energy source. The BUCK/BOOST pre-stage PWM signal processing circuit sends PWM signals output by the single-chip microcomputer to the IGBT power drive and protection circuit through a plug-in after hardware logic processing, dead zone logic processing, level conversion and power amplification. The function of the IGBT power drive and protection circuit is to improve the drive capability of PWM to ensure that the IGBT module of the BUCK/BOOST power conversion circuit can be effectively driven, and to restrict the instantaneous voltage/current of the drive gate to ensure the working safety of the IGBT module. A dead zone logic processing circuit is added so that the safety of the circuit is increased. A 624V energy storage platform is adopted in the present invention. In the present invention, the power conversion current is lower, the conversion efficiency is higher, and the current required for the power device is lower, and the cost is lower.

Embodiment 2

Figure 3:
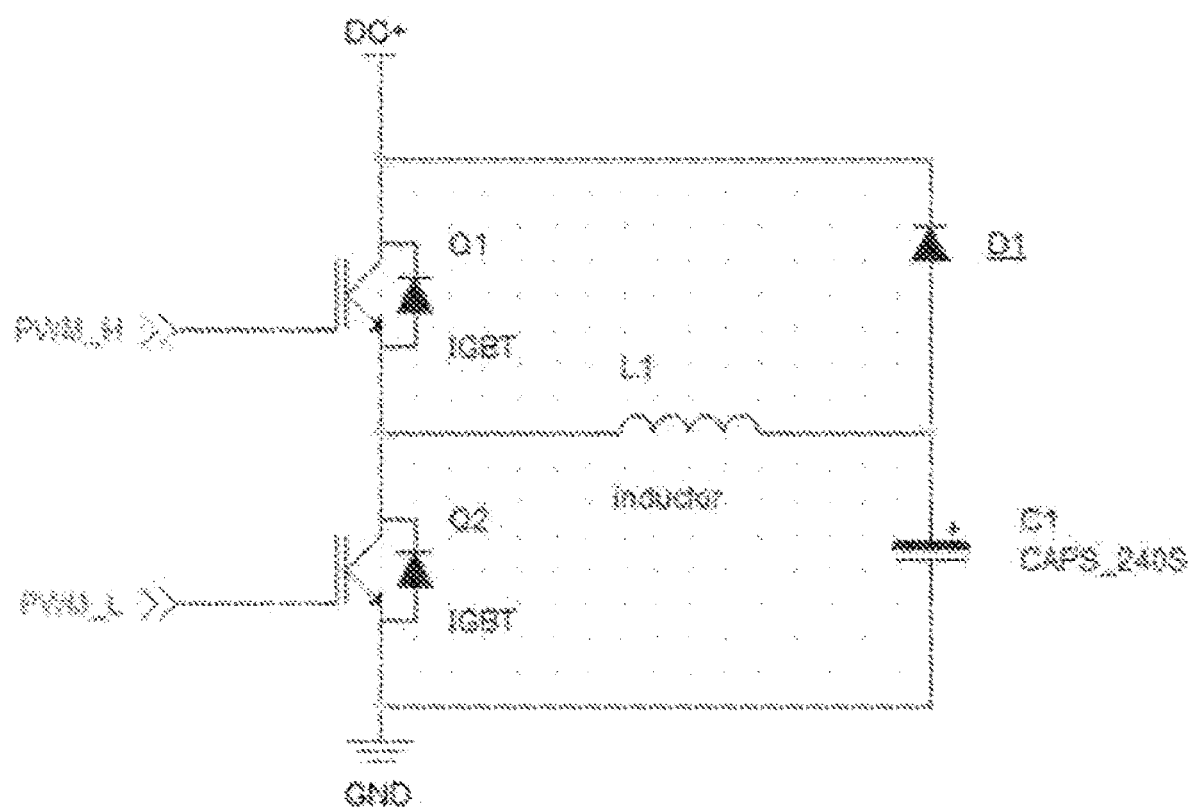
FIG. 3 is a schematic diagram of the BUCK/BOOST power conversion circuit.

As shown in FIG. 3, on the basis of embodiment 1, the BUCK/BOOST power conversion circuit comprises two IGBT modules (transistor Q1 and transistor Q2) connected in series and a BUCK/BOOST conversion inductor (inductor L1), the BUCK/BOOST conversion inductor is formed by winding a plurality of strands of cotton insulated wires around a high-power magnetic ring to realize a BUCK/BOOST energy conversion, the series connection node of the two IGBT modules is connected to the BUCK/BOOST conversion inductor, and the other ends of the two IGBT modules are connected to the direct-current bus and grounded, respectively, wherein the IGBT module connected to the direct-current bus and the BUCK/BOOST conversion inductor form a BUCK circuit, the other IGBT module forms a BOOST circuit together with the BUCK/BOOST conversion inductor, the BUCK/BOOST conversion inductor is connected to the energy storage unit (capacitor C1), a node between the BUCK/BOOST conversion inductor is connected to the positive electrode of a diode D1, and the negative electrode of the diode D1 is connected to the direct-current bus.

Principle of Operation

The IGBT modules and power type IGBT modules realize switch control in the BUCK circuit and the BOOST circuit. The IGBT modules are major power devices of the system and the size of the converted current directly decides the heat loss of the IGBT modules. Therefore, the energy storage unit of the present invention also reduces the requirements of the system for the IGBT modules. The IGBT power drive circuit consists of an isolated drive power supply, isolated optical coupler and a drive transistor. The function of the IGBT power drive circuit is to receive PWM signal control sent from the single-chip microcomputer system mainboard to realize effective driving of the IGBT modules in the BUCK circuit and the BOOST circuit, and ensure the level isolation between the high- and low-voltage circuits. The power conversion inductor mainly realizes an electromagnetic conversion of the BUCK circuit and the BOOST circuit. The inductor is formed by winding a plurality of strands of cotton insulated wires around a high-power magnetic ring and has a high high-frequency performance and a high conversion efficiency. The diode D1 allows the potential energy of the beam pumping unit to be converted by the electric motor into an alternating-current voltage when the electric motor is in the power generation state. The alternating-current voltage is converted by a backward diode D1 connected with the IGBT module in parallel and is then superimposed on the direct-current bus. In this case, the voltage on the direct-current bus will increase, and the BUCK conversion circuit adopts the electric-magnetic-electric conversion mode to store the increased voltage in the energy storage unit.

Embodiment 3

As shown in FIG. 1, on the basis of embodiment 1, an energy storage unit zero-volt charging and benchmark processing circuit is further connected to the three-phase alternating-current contactor, the other end of the energy storage unit zero-volt charging and benchmark processing circuit is connected to a charging/discharging end of the energy storage unit, and the energy storage zero-volt charging and benchmark processing circuit is an isolated constant-current charging circuit. The function of the energy storage unit zero-volt charging and benchmark processing circuit is to realize zero-volt charge for the initial power-on of supercapacitor modules on the one hand, and realize low-current charging for the 300V benchmark voltage of the supercapacitor modules on the other hand, thus improving the charging safety of the energy storage unit.

Embodiment 4

As shown in FIG. 1, on the basis of embodiment 1, an isolated voltage detection unit for a voltage detection of the direct-current bus, the energy storage unit and the three-phase alternating-current contactor are connected to the single-chip microcomputer system mainboard, a linear optical coupling mode is adopted for the isolated voltage detection unit for an electric motor detection and an electric isolation, an isolated current detection unit is further connected to the single-chip microcomputer system mainboard, and a Hall current sensor and a mutual inductance current sensor are adopted for the isolated current detection unit to detect the current of the electric motor and the current at a BUCK/BOOST voltage conversion and send the current to the single-chip microcomputer for signal processing.

Further, the isolated voltage detection unit comprises a power grid voltage detection subunit connected to the three-phase alternating-current contactor, a direct-current bus voltage detection subunit connected to the direct-current bus positive electrode and an energy storage voltage detection subunit connected to the energy storage unit, and the power grid voltage detection subunit, the direct-current bus voltage detection subunit and the energy storage voltage detection subunit are respectively connected to the single-chip microcomputer system mainboard after electrical/photoelectric isolation processing. The isolated voltage detection unit adopts the optical coupling isolation technology to detect the voltage of the system bus, the voltage of the energy storage unit and the three-phase alternating-current voltage, respectively. The detection data are used as judgment bases of BUCK/BOOST working logics. The isolated current detection system is used to realize a current detection at a BUCK/BOOST voltage conversion, determine the charging/discharging state and send the data to the single-chip microcomputer for signal processing.

Further, the three-phase alternating-current contactor is connected to a system power supply for supplying power to the single-chip microcomputer system mainboard through a system switch, two-stage voltages are adopted for the system power supply, the first-stage voltage is 380V to 220V for isolating the transformer to convert the three-phase voltage into a 220V low voltage, and the second-stage voltage is a high-frequency flyback switching power supply. The volume of the three-phase alternating-current contactor is small and the working efficiency is high.

Further, a display circuit is connected to the single-chip microcomputer system mainboard, and the display circuit is an OLED display. The function of the OLED display is to realize human-machine interactions of the system and display major parameters of the system in the form of graphs and texts on the liquid crystal display screen to let the equipment user or operator learn the real-time working state of the system. The OLED display has a high low-temperature performance and can work reliably at a temperature below 40° C.

As shown in FIG. 2, the single-chip microcomputer system mainboard comprises a single-chip microcomputer digital processing minimum system, a logic signal input/output processing circuit connected to the single-chip microcomputer digital processing minimum system and an OLED display drive circuit for driving the OLED display, and the single-chip microcomputer type of the single-chip microcomputer digital processing minimum system is a TMS320F28335 floating point DSP. The function of the logic signal input/output processing circuit is, on the one hand, to input detected logic signals of external devices into the single-chip microcomputer system mainboard, and then send them to the single-chip microcomputer for digital signal processing after level conversions, and on the other hand, to perform level conversions and drive processing for logic control signals output from the single-chip microcomputer and then output them through plug-ins to control external actuating devices. The secondary auxiliary power supply connected to the system power supply of the single-chip microcomputer system mainboard is used to produce various high-stable voltages and isolation voltages required for the working of the system.

Further, a CAN communication module for external communication is connected to the single-chip microcomputer system mainboard, and the isolated CAN 2.0 communication mode is adopted for the CAN communication module.

Although the present invention is described by reference to the explanatory embodiments of the present invention, the above-mentioned embodiments are only preferred embodiments of the present invention and the present invention is not limited to the above-mentioned embodiments. It should be understood that those skilled in the art can make various modifications and design other implementation modes, and these modifications and implementation modes shall fall within the principle and spirit disclosed in the present invention.

The invention claimed is:

1. A supercapacitor based automatic energy-saving system of a direct-current high-voltage beam pumping unit, characterized in that the system comprises a frequency converter connected to a three-phase power grid and a three-phase alternating-current contactor; a direct-current bus of the frequency converter is combined with a direct-current contactor, a BUCK/BOOST power conversion circuit and an energy storage unit to form a series loop; the system further comprises a single-chip microcomputer system mainboard connected to the direct-current contactor and the BUCK/BOOST power conversion circuit; the single-chip microcomputer system mainboard is in communication connection with the energy storage unit; a BUCK/BOOST pre-stage PWM processing circuit is connected between the single-chip microcomputer system mainboard and the BUCK/BOOST power conversion circuit; the BUCK/BOOST pre-stage PWM processing circuit comprises a BUCK module PWM processing circuit and a BOOST module PWM processing circuit which are connected to the single-chip microcomputer system mainboard; a dead zone logic processing circuit is connected between the BUCK module PWM processing circuit and the BOOST module PWM processing circuit; and the BUCK module PWM processing circuit and the BOOST module PWM processing circuit are connected to the BUCK/BOOST control ends of the BUCK/BOOST power conversion circuit, respectively, after being connected to an optical coupling isolator and an IGBT power drive and protection circuit, respectively, wherein the BUCK/BOOST power conversion circuit comprises two IGBT modules connected in series and a BUCK/BOOST conversion inductor, the BUCK/BOOST conversion inductor is formed by winding a plurality of strands of cotton insulated wires around a high-power magnetic ring to realize a BUCK/BOOST energy conversion, the series connection node of the two IGBT modules is connected to the BUCK/BOOST conversion inductor, and the other ends of the two IGBT modules are connected to the direct-current bus and grounded, respectively, wherein the IGBT module connected to the direct-current bus and the BUCK/BOOST conversion inductor form a BUCK circuit, the other IGBT module forms a BOOST circuit together with the BUCK/BOOST conversion inductor, the BUCK/BOOST conversion inductor is connected to the energy storage unit, a node between the BUCK/BOOST conversion inductor is connected to the positive electrode of diode D1, and the negative electrode of the diode D1 is connected to the direct-current bus.

2. The supercapacitor based automatic energy-saving system of a direct-current high-voltage beam pumping unit according to claim 1, characterized in that an energy storage unit zero-volt charging and benchmark processing circuit is further connected to the three-phase alternating-current contactor, another end of the energy storage unit zero-volt charging and benchmark processing circuit is connected to a charging/discharging end of the energy storage unit, and the energy storage zero-volt charging and benchmark processing circuit is an isolated constant-current charging circuit.

3. The supercapacitor based automatic energy-saving system of a direct-current high-voltage beam pumping unit according to claim 1, characterized in that an isolated voltage detection unit for a voltage detection of the direct-current bus, the energy storage unit and the three-phase alternating-current contactor are connected to the single-chip microcomputer system mainboard; a linear optical coupling mode is adopted for the isolated voltage detection unit for an electric motor detection and an electric isolation; an isolated current detection unit is further connected to the single-chip microcomputer system mainboard; and a Hall current sensor and a mutual inductance current sensor are adopted for the isolated current detection unit to detect the current of an electric motor and the current at a BUCK/BOOST voltage conversion and send the current to the single-chip microcomputer for signal processing.

4. The supercapacitor based automatic energy-saving system of a direct-current high-voltage beam pumping unit according to claim 3, characterized in that the isolated voltage detection unit comprises a power grid voltage detection subunit connected to the three-phase alternating-current contactor, a direct-current bus voltage detection subunit connected to the direct-current bus positive electrode and an energy storage voltage detection subunit connected to the energy storage unit; and the power grid voltage detection subunit, the direct-current bus voltage detection subunit and the energy storage voltage detection subunit are respectively connected to the single-chip microcomputer system mainboard after electrical/photoelectric isolation processing.

5. The supercapacitor based automatic energy-saving system of a direct-current high-voltage beam pumping unit according to claim 1, characterized in that the three-phase alternating-current contactor is further connected to a system power supply for supplying power to the single-chip microcomputer system mainboard through a system switch, two-stage voltages are adopted for the system power supply, the first-stage voltage is 380V to 220V for isolating the transformer, and the second-stage voltage is a high-frequency flyback switching power supply.

6. The supercapacitor based automatic energy-saving system of a direct-current high-voltage beam pumping unit according to claim 1, characterized in that the energy storage unit is formed by connecting a plurality of groups of supercapacitor monomers with a low internal resistance in series.

7. The supercapacitor based automatic energy-saving system of a direct-current high-voltage beam pumping unit according to claim 1, characterized in that a display circuit is further connected to the single-chip microcomputer system mainboard, and the display circuit is an organic light-emitting diode ("OLED") display.

8. The supercapacitor based automatic energy-saving system of a direct-current high-voltage beam pumping unit according to claim 7, characterized in that the single-chip microcomputer system mainboard comprises a single-chip microcomputer digital processing minimum system, a logic signal input/output processing circuit connected to the single-chip microcomputer digital processing minimum system and a display drive circuit for driving the organic light-emitting diode ("OLED") display; and the single-chip microcomputer type of the single-chip microcomputer digital processing minimum system is a floating point DSP.

9. The supercapacitor based automatic energy-saving system of a direct-current high-voltage beam pumping unit according to claim 1, characterized in that a controller area network ("CAN") communication module for external communication is further connected to the single-chip microcomputer system mainboard, and the isolated CAN2.0 communication mode is adopted for the CAN communication module.

* * * * *